C. S. NYBERG.
BALANCED PULLEY.
APPLICATION FILED APR. 17, 1916.
1,189,726.
Patented July 4, 1916.
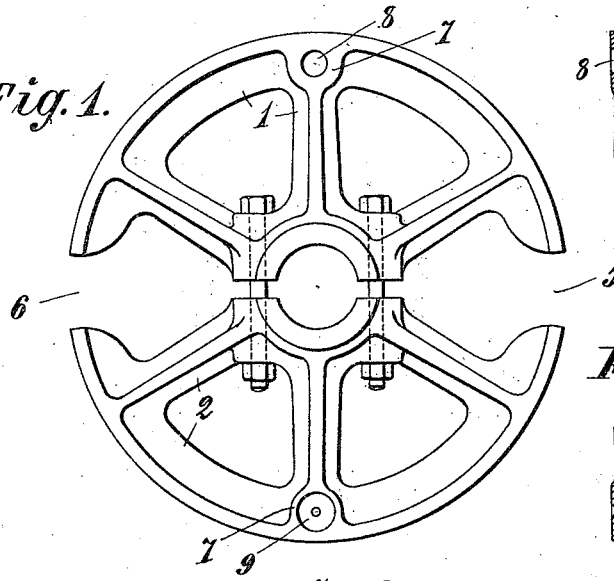
Fig. 1.
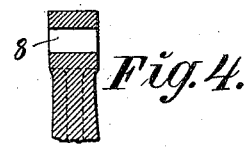
Fig. 4.
Fig. 5.
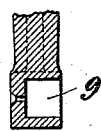
Fig. 2.
Fig. 8.
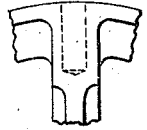
Fig. 6.
Fig. 7.
Fig. 3.
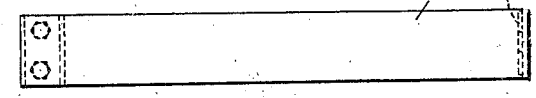
Inventor
Carl Siegfried Nyberg
by Otto ꟷꟷꟷ
his Attorney

UNITED STATES PATENT OFFICE.

CARL SIGFRID NYBERG, OF HASSELBACKEN, MELLÖSA, SWEDEN.

BALANCED PULLEY.

1,189,726.

Specification of Letters Patent.

Patented July 4, 1916.

Application filed April 17, 1916. Serial No. 91,571.

*To all whom it may concern:*

Be it known that I, CARL SIGFRID NYBERG, a subject of the King of Sweden, and resident of Hasselbacken, Mellösa, in the Kingdom of Sweden, engineer, have invented certain new and useful Improvements in Balanced Pulleys, of which the following is a specification, reference being made to the accompanying drawing.

The present invention refers to split belt pulleys, especially to that type of such pulleys in which the parts are held together by means of rivets, bolts, joint pieces or the like. In such pulleys an unequal distribution of weight often occurs, which, when the pulley is to revolve at high speed, requires balancing of the weights in the same.

The present invention refers to means for balancing split belt pulleys provided with exchangeable bands, and consists essentially in balancing the frame separately and the band separately, whereby the advantage is obtained that, when selling the pulleys, there is no need to pay any attention to the balancing of the same, as a pulley is by this means always balanced irrespective of the band chosen for the same.

The invention is illustrated in the accompanying drawing in which—

Figure 1 shows a side view of the frame of a split belt pulley. Figs. 2 and 3 are a side view and a plan view respectively of the detachable band of the same. Figs. 4–8 inclusive show details.

The frame according to Fig. 1 consists of two parts 1 and 2 which are held together by means of the band 3 and, if necessary, also by bolts through the nave portion. The band consists of steel the ends of which are bent inward at 4 and are there connected by bolts by the tightening of which the parts are held together and the whole pulley can be fastened to its shaft.

As to the frame, balancing of the same is often required on account of the fact that a displacement of weight in the same may occur if the hole in the nave portion, when being turned out, becomes somewhat eccentrically located, and, moreover, due to the fact that the circular rim of the parts 1 and 2 is turned concentrically with the hole in the nave portion. If for such reason the displacement of weight has taken place along a diameter going through the openings 5 and 6 in the rim or close to said openings the balancing of the frame can be obtained by turning one half of the frame in relation to the other half so that the opposite ends of the edge portions on the lighter side of the pulley will come nearer to each other than on the diametrically opposed side. To make such an adjustment possible the holes for the nave screws must evidently be sufficiently large. If, however, the above mentioned displacement of weight has taken place along a diameter forming a larger angle to the first mentioned diameter, the balancing required for this purpose and generally amounting to small weights, may be obtained by special means, one being shown as an example on the drawing.

A form thereof consists in providing each half of the rim with a cast enlargement 7 and in boring a hole 8 in the enlargement on that half of the rim toward which the displacement has taken place, said holes 8, Figs. 1 and 4, being so large that the weight of the metal removed by the boring is just sufficient to restore the equilibrium.

Another form of the invention consists in providing a recess 9, Fig. 5, in each enlargement 7 when casting the pulley and introducing into the recess of the lighter half of the pulley a certain quantity of some material the weight of which is sufficient for restoring the equilibrium.

A third form of the invention consists in providing each enlargement when casting the pulley, with a projection and then grinding off one of the projections sufficiently to restore the equilibrium.

In Figs. 6 and 7 a form of the invention is shown according to which in the heavier half of the rim a hole is bored in radial direction and of suitable size for restoring the equilibrium.

As to the pulley rim 3, Figs. 2 and 3, the same will obtain an increased weight at 4 due to the joint being located there. Balancing of this increased weight is, according to this form of construction, obtained by means of a piece or several pieces 10 of sheet iron, Fig. 8, fitted in any suitable manner between the tire and the rim and preferably fastened to the former.

Having now described my invention, what

I claim as new and desire to secure by Letters Patent is:

In a device of the character specified, the combination of a pulley comprising balanced pulley sections, there being peripheral spaces between the sections of said pulley, a band for said pulley sections, means projecting into one of said spaces for securing said band about said sections, and means projecting into a diametrically opposite space for counter-balancing said band securing means.

In witness whereof I have hereunto set my hand in presence of two witnesses.

CARL SIGFRID NYBERG.

Witnesses:
CARL TH. SUNDHOLM,
H. B. OHLSSON.

Copies of this patent may be obtained for five cents each, by addressing the "Commissioner of Patents, Washington, D. C."